United States Patent
Zhang et al.

(10) Patent No.: US 9,830,166 B2
(45) Date of Patent: Nov. 28, 2017

(54) SOFTWARE-DEFINED IOT CONTROLLER

(71) Applicant: Verizon Patent and Licensing Inc., Arlington, VA (US)

(72) Inventors: Zhi-hong Zhang, Foster City, CA (US); Jonathan Andrew Banks, Dublin, CA (US); Laiwah Alice Leung, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 226 days.

(21) Appl. No.: 14/688,852

(22) Filed: Apr. 16, 2015

(65) Prior Publication Data
US 2016/0308957 A1 Oct. 20, 2016

(51) Int. Cl.
G06F 9/44 (2006.01)
G06F 9/455 (2006.01)

(52) U.S. Cl.
CPC .............. *G06F 9/4425* (2013.01); *G06F 8/36* (2013.01); *G06F 9/45508* (2013.01)

(58) Field of Classification Search
CPC .................................................... G06F 9/4425
USPC ............................................................ 709/201
See application file for complete search history.

(56) References Cited

U.S. PATENT DOCUMENTS

2015/0249642 A1\* 9/2015 Burns ................. H04L 12/66
726/4
2016/0105292 A1\* 4/2016 Choi ................. H04L 12/2818
709/206

OTHER PUBLICATIONS

AT&T, "Supported Platforms", https://m2x.att.att.com/developer.supportedplatforms, Sep. 5, 2014, 8 pages.
R. Colin Johnson, "Drones and Wearables App Store Launches", http://www.eetimes.com/document.asp?doc_id=1325341, Jan. 20, 2014, 5 pages.
Oskar Andero, "Dynamic Android Sensor HAL D\*A\*S\*H", Sony Corporation, 2012, 36 pages.
Rachel Cericola, "ALYT Launches Android Smart Home Manager on Indiegogo", http://www.electronichouse.com/daily/smarthome/alytlaunchesandroidsmarthomemanageronindiegogo/, Apr. 11, 2014, 2 pages.
Sensor Platforms, Inc., "Open Sensor Platform White Paper", http://community.arm.com/servlet/JiveServlet/previewBody/8657-102-1-15597/OSP%20White%20Paper.pdf, Apr. 7, 2014, 4 pages.

(Continued)

*Primary Examiner* — David Lazaro
*Assistant Examiner* — Zia Khurshid

(57) ABSTRACT

An Internet of things (IoT) controller may execute a first IoT application, associated with operating an IoT device, and a second IoT application associated with operating the IoT device. The IoT controller may load an IoT application program interface (API) associated with the first IoT application and the second IoT application, and may identify a first set of functions including a first function, associated with the first IoT application, and a second function associated with the second IoT application. The IoT controller may translate, based on the IoT API, the first set of functions to a second set of functions including a third function, associated with the first IoT application, and a fourth function associated with the second IoT application. The IoT controller may cause the IoT device to operate, based on the second set of functions, during the execution of the first IoT application and the second IoT application.

20 Claims, 12 Drawing Sheets

(56) References Cited

OTHER PUBLICATIONS

Sanem Kabadayi et al., "Virtual Sensors: Abstracting Data from Physical Sensors", University of Texas, 2006, 6 pages.
Indiegogo, "ALYT: Beyond Smart: Genius", www.indiegogo.com/projects/alyt-beyond-smart-genius, Apr. 25, 2014, 43 pages.

* cited by examiner

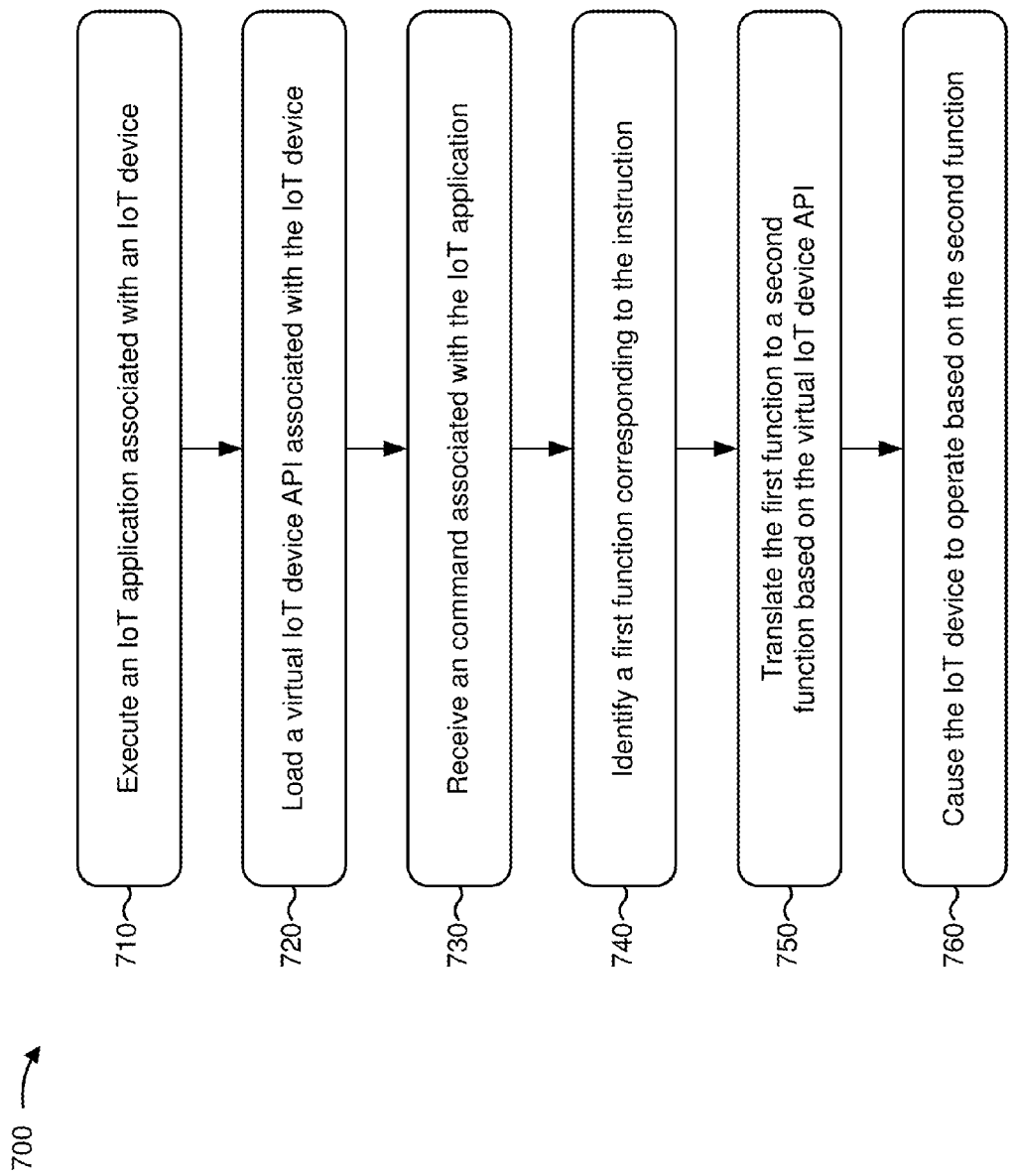

SOFTWARE-DEFINED IOT CONTROLLER

BACKGROUND

The Internet of things (IoT) refers to the network of physical objects with Internet connectivity, and the communication between such objects and other Internet-enabled devices and systems. The IoT extends Internet connectivity beyond traditional devices (e.g., desktop computers, laptop computers, smart phones etc.) to a range of devices and everyday things that may utilize embedded technology to communicate and interact with an external environment via the Internet.

BRIEF DESCRIPTION OF THE DRAWINGS

FIG. 7 is a flow chart of an example process causing an IoT device to operate based on translating a function, associated with an IoT application for the IoT device, using a virtual IoT device API;

DETAILED DESCRIPTION OF PREFERRED EMBODIMENTS

The following detailed description of example implementations refers to the accompanying drawings. The same reference numbers in different drawings may identify the same or similar elements.

An IoT device may operate based on one or more IoT applications installed on the IoT device. For example, a robotics device may operate based on a movement control application, a voice communication application, a dancing application, or the like. As another example, an unmanned aerial vehicle (UAV or "drone") may operate based on an auto-pilot application, a video processing application, an object analysis application, or the like. Traditionally, a platform (e.g., including hardware and/or software) for the IoT device may be selected and/or designed based on such IoT applications (e.g., such that the platform is selected and/or designed specifically for the IoT device). For example, with respect to a controller in a drone, sensing components, motor control components, or the like, may be selected and/or designed specifically for the drone (i.e., the components may not be used in another type of IoT device).

Additionally, under the traditional design approach, an IoT application may be developed using a hardware dependent programming language, such as C programming language. As such, an IoT application developer may be unable to develop the IoT application using a high-level programming language, such as Java programming language, Python programming language, or the like. As such, the IoT application developer may need specific knowledge of hardware included in the IoT device.

Implementations described herein provide a platform that uses a virtual IoT device API that allows a generic IoT controller to be software-defined for use in different IoT applications and/or different IoT devices. Moreover, in some implementations, the platform may allow an IoT application developer, associated with an IoT application, to develop the IoT application using a high-level programming language (e.g., based on the virtual IoT device API).

Figure 1A:
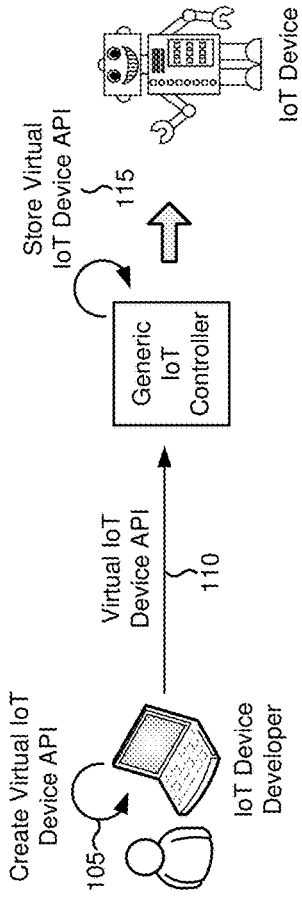
FIGS. 1A-1C are diagrams of an overview of an example implementation described herein.
Figure 1B:
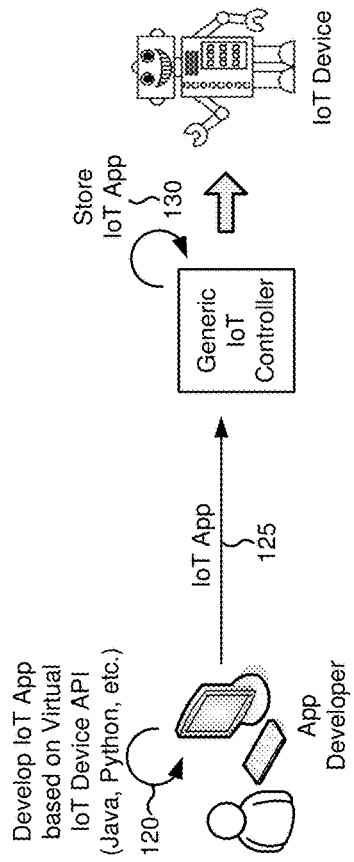
Figure 1C:
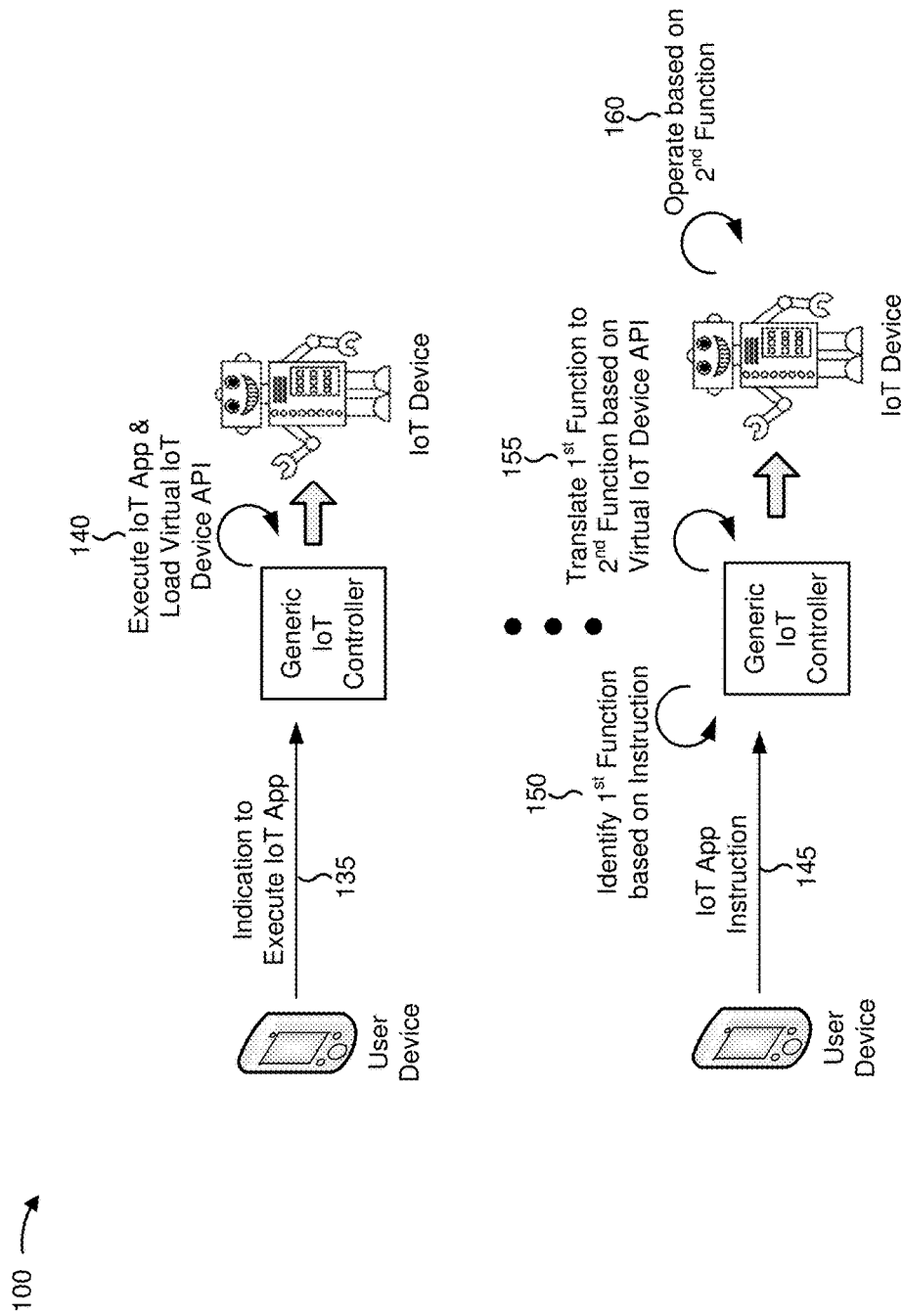

FIGS. 1A-1C are diagrams of an overview of an example implementation 100 described herein. For the purposes of example implementation 100, assume that an IoT device developer develops an IoT device that includes a generic IoT controller. Further, assume that the IoT device developer has access to driver API information associated with the generic IoT controller (e.g., provided by a designer of the generic IoT controller). As shown in FIG. 1A, and by reference number 105, the IoT device developer may create a virtual IoT device API based on the driver API information associated with the generic IoT controller. As shown by reference number 110, the IoT device developer may provide (e.g., via an IoT device developer device) the virtual IoT device API to the generic IoT controller. As shown by reference number 115, the generic IoT controller may receive and store the virtual IoT device API (e.g., such that the virtual IoT device API may be loaded at a later time). Notably, in this example, the generic IoT controller may be capable of storing one or more virtual IoT device APIs for multiple IoT devices (e.g., a robotics device, a sensing device, a drone, etc.). As such, the generic IoT controller may be included in different IoT devices, and may be capable of executing applications for the different IoT devices (e.g., based on the corresponding virtual IoT device APIs).

For the purposes of FIG. 1B, assume that an IoT application developer device, associated with an IoT application developer, stores or has access to the virtual IoT device API associated with the IoT device. As shown in FIG. 1B, and by reference number 120, the IoT application developer may develop, based on the virtual IoT device API, the IoT application in a high-level programming language (e.g., Java, Python, etc.). As shown by reference number 125, the application developer device may provide the IoT application to the generic IoT controller. As shown by reference number 130, the generic IoT controller may store the IoT application (e.g., such that the IoT application may be executed at a later time).

For the purposes of FIG. 1C, assume that a user device is capable of communicating with the generic IoT controller (e.g., such that the user device may control, operate, manipulate, etc., the IoT device via the IoT application). As shown by reference number 135, the user device may provide (e.g., based on user input) an indication to execute the IoT application stored by the generic IoT controller. As shown by reference number 140, the generic IoT controller may execute the IoT application and may load the virtual IoT device API for the IoT device.

As shown by reference number 145, the user device may provide (e.g., based on user input) a command associated with the IoT application (e.g., for controlling, operating, manipulating, etc., the IoT device). As shown by reference number 150, the generic IoT controller may identify a first function corresponding to the command. Here, the first function may be described in the high-level programming language in which the IoT application was created. As shown by reference number 155, the generic IoT controller may translate the first function to a second function (e.g., a function in a language that may be used to control hardware of the IoT device) based on the virtual IoT device API. As shown by reference number 160, the generic IoT controller may then cause the IoT device to operate based on the second function.

In this way, a virtual IoT device API may allow a generic IoT controller to be software-defined for use in different IoT applications and/or with different IoT devices. Moreover, in some implementations, an IoT application developer, associated with an IoT application, may develop the IoT application using a high-level programming language and based on the virtual IoT device API.

Figure 2:
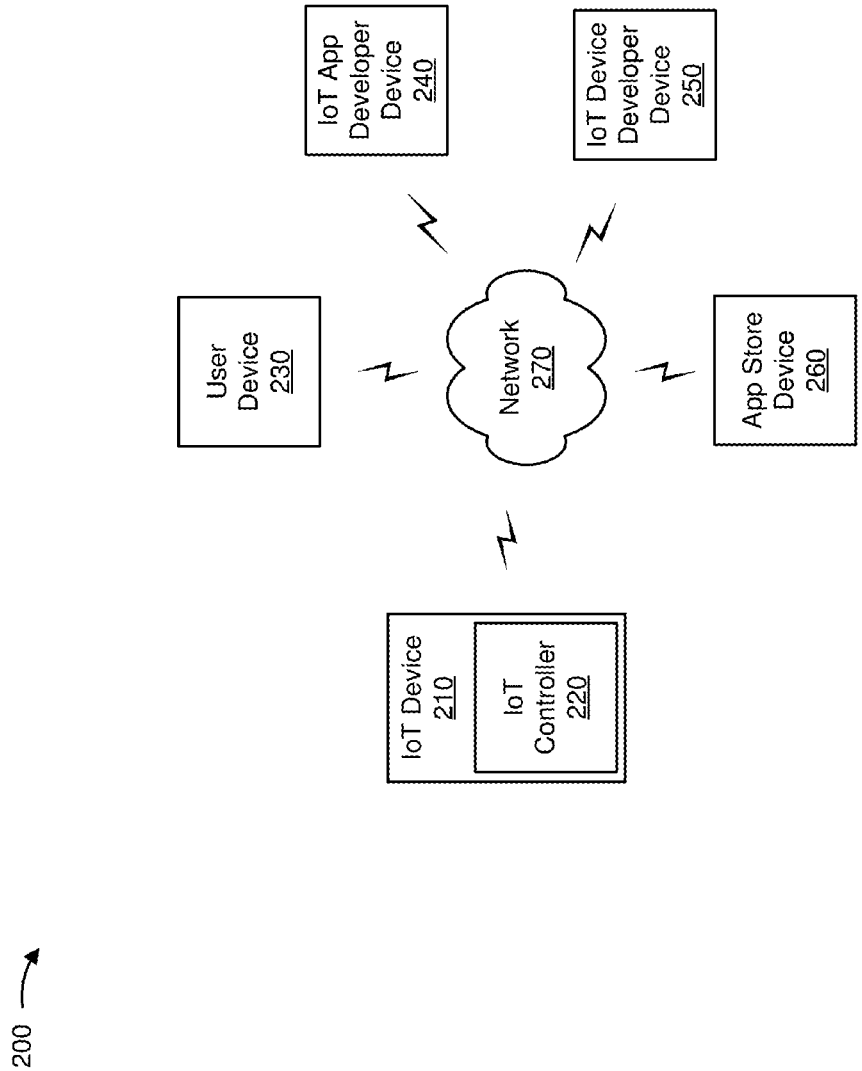
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an IoT device 210, an IoT controller 220, a user device 230, an IoT app developer device 240, an IoT device developer device 250, an IoT app store device 260, and a network 270. Devices of environment 200 may interconnect via wired connections, wireless connections, or a combination of wired and wireless connections.

IoT device 210 may include a device that is capable of receiving, processing, generating, determining, and/or providing information via the IoT. For example, IoT device 210 may include a computing device (e.g., a desktop computer, a laptop computer, a tablet computer, a handheld computer, a camera, an audio recorder, a camcorder, etc.), an appliance (e.g., a refrigerator, a microwave, a stove, etc.), a sensing device (e.g., a temperature sensor, a pressure sensor, an accelerometer, etc.), a processing device, a metering device, a machine-to-machine (M2M) device, a robotics device, a drone, a medical device, an automobile, a light bulb, and/or another type of device. In other words, IoT device 210 may be any "thing" in the IoT. In some implementations, IoT device 210 may include IoT controller 220.

IoT controller 220 may include a device capable of controlling, operating, manipulating, communicating with, or the like, IoT device 210. For example, IoT controller 220 may include a computing device (e.g., a single-board computer, a system on a chip, an integrated circuit, etc.) that includes a processing device (e.g., a central processing unit (CPU), a microprocessor, etc.), a memory component, an input/output (I/O) component, and/or one or more other components. In some implementations, IoT controller 220 may be a generic controller (i.e., IoT controller 220 may not be designed for a particular IoT device and/or a particular IoT application). Additionally, or alternatively, IoT controller 220 may be capable of sending and/or receiving information via network 270. For example, IoT controller 220 may include a modem, such as a 3G modem, a 4G modem, or the like. In some implementations, IoT controller 220 may be capable of storing and/or loading one or more virtual IoT device APIs and/or storing and/or executing one or more IoT applications.

User device 230 may include one or more devices capable of receiving, generating, storing, processing, and/or providing information related to an application associated with IoT device 210. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 230 may allow a user to control, operate, manipulate, or the like, IoT device 210 via IoT controller 220.

IoT app developer device 240 may include a device associated with an application developer that develops, creates, generates, produces, and/or designs an application associated with IoT device 210. For example, IoT app developer device 240 may include a server device or a collection of server devices. In some implementations, IoT app developer device 240 may provide and/or send the application to another device, such as app store device 260 (e.g., such that the application may be accessed, received, stored, executed, etc., by another device of environment 200).

IoT device developer device 250 may include a device associated with an IoT device developer that develops, creates, generates, produces, and/or designs IoT device 210 and/or one or more components of IoT device 210. For example, Tot device developer device 250 may include a server device or a collection of server devices. In some implementations, Tot device developer device 250 may provide and/or send information associated with IoT device 210 (e.g., a virtual IoT device API) that allows one or more applications to be executed by IoT device 210 and/or IoT controller 220.

IoT app store device 260 may include a device associated with distributing, providing, and/or selling IoT device 210, IoT controller 220, and/or one or more IoT applications associated with IoT device 210. For example, IoT app store device 260 may include a server device or a collection of server devices. In some implementations, IoT app store device 260 may allow a user to (e.g., via user device 230) purchase, download, receive, or the like, IoT device 210, IoT controller 220, and/or the one or more IoT applications.

Network 270 may include one or more wired and/or wireless networks. For example, network 270 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
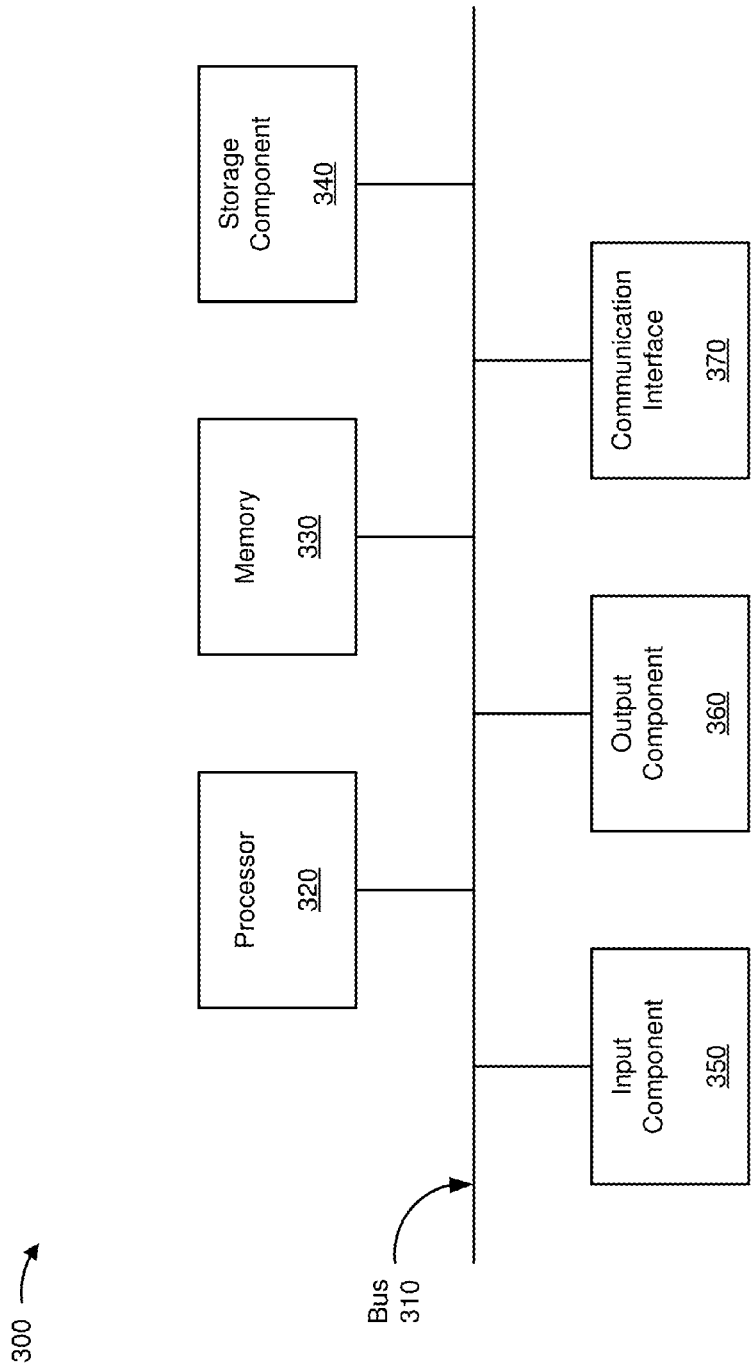
FIG. 3 is a diagram of example components of one or more devices of FIG. 2.

FIG. 3 is a diagram of example components of a device 300. Device 300 may correspond to IoT device 210, IoT controller 220, user device 230, IoT app developer device 240, IoT device developer device 250, and/or app store device 260. In some implementations, IoT device 210, IoT controller 220, user device 230, IoT app developer device 240, IoT device developer device 250, and/or app store device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
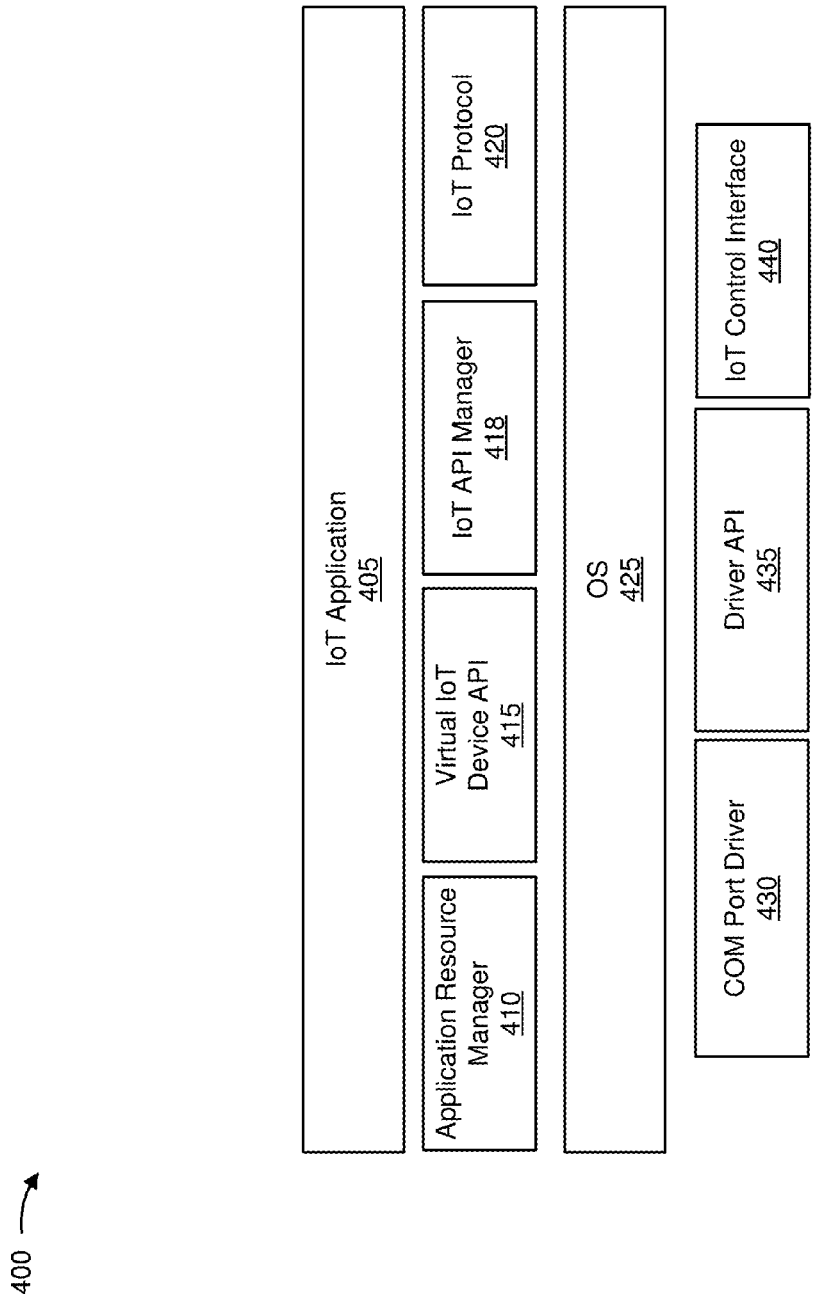
FIG. 4 is a diagram of an functional elements of one or more devices of FIG. 2.

FIG. 4 is a diagram of example functional elements of device 400 that corresponds to one or more devices of FIG. 2. In some implementations, device 400 may correspond to IoT controller 220 and/or IoT device 210. In other implementations, one or more of the example functional elements of device 400 may be implemented by another device or a collection of devices including or excluding IoT device 210 and/or IoT controller 220, such as by one or more other devices of environment 200. As shown in FIG. 4, device 400 may include an IoT application 405, an application resource manager 410, a virtual IoT device API 415, IoT API manager 418, an IoT protocol 420, an operating system (OS) 425, a communications (COM) port driver 430, a driver API 435, and an IoT control interface 440. In some implementations, functional elements 405-440 may be implemented using one or more devices 300 and/or one or more components of device 300.

IoT application 405 may perform operations associated with an IoT application used to control, manage, manipulate, operate, and/or communicate with IoT device 210. In some implementations, IoT application 405 may be developed, created, generated, produced, and/or designed by an IoT application developer associated with IoT app developer device 240. In some implementations, IoT application 405 may be written using a high-level programming language, such as Java programming language, Python programming language, or the like. In some implementations, IoT application 405 may include a manifest that identifies one or more other functional elements needed to execute IoT application 405. For example, IoT application 405 may include a manifest that includes information (e.g., a name, a version number, etc.) that identifies one or more virtual IoT device APIs 415, one or more driver APIs 435, or the like, that may be needed to execute IoT application 405. In some implementations, IoT application 405 may receive and/or provide information from and/or to user device 230 and/or one or more other functional elements of device 400.

In some implementations, device 400 may include multiple IoT applications 405. Additionally, or alternatively, device 400 may receive and store an additional IoT application 405 (e.g., device 400 may receive and store a first IoT application 405 on a first day, a second IoT application 405 on a thirtieth day, etc.). In some implementations, device 400 may maintain a collaboration list associated with sharing of resources by the multiple IoT applications 405. For example, device 400 may maintain a collaboration list that describes how a first IoT application 405 is to (e.g., simultaneously, concurrently, etc.) work in conjunction with a second IoT application 405 in order to share resources (e.g., one or more virtual IoT device APIs 415, one or more driver APIs 435, one or more hardware components of IoT device 210, etc.) needed to execute the first IoT application 405 and the second IoT application 405.

Application resource manager 410 may perform operations associated with managing, installing, uninstalling, updating, and/or licensing IoT application 405. In some implementations, application resource manager 410 may be capable of protecting IoT application 405 (e.g., from software piracy activities). Additionally, or alternatively, application resource manager 410 may be capable of managing resources (e.g., one or more virtual IoT device APIs 415, one or more driver APIs 435, one or more hardware components of IoT device 210, etc.) to be concurrently used by a first IoT application 405 and a second IoT application 405 (e.g., when the first IoT application 405 and the second IoT application 405 are being executed at the same time) based on a collaboration list associated with one or more IoT applications 405.

Virtual IoT device API 415 may perform operations associated with translating a first function to a second function (e.g., from a high-level programming language to a hardware dependent programming language) such that IoT device 210 may be controlled, managed, manipulated, operated, and/or communicated via IoT application 405. For example, device 400 may receive an indication (e.g., provided by user device 230) to execute IoT application 405, and device 400 may execute IoT application 405 and load virtual IoT device API 415. Here, IoT application 405 may receive a command and may identify a first function corresponding to the command. Virtual IoT device API 415 may translate the first function (e.g., from a high-level programming language) to a second function (e.g., in another language, such as C programming language) such that IoT device 210 may operate in accordance with the second function. In this way, virtual IoT device API 415 may isolate IoT application 405 from directly controlling one or more hardware components of IoT device 210.

In some implementations, virtual IoT device API 415 may be accessed by an IoT application developer of IoT application 405, and may allow the IoT application developer to treat IoT device 210 as a virtual IoT device (e.g., since the application developer need not have particular knowledge of hardware components of IoT device 210 in order to develop IoT application 405 in the high-level programming language). In some implementations, virtual IoT device API 415 may be generated, created, developed, and/or provided by an IoT device developer associated with IoT device developer device 250. In some implementations, device 400 may include one or more virtual IoT device APIs 415 (e.g., where each of the one or more virtual IoT device APIs 415 may be associated with one or more IoT applications 405 and/or one or more driver APIs 435).

IoT API manager 418 may perform operations associated with managing, obtaining, retrieving, and/or storing virtual IoT device API 415 and/or driver API 435 that may be needed to execute IoT application 405. For example, device 400 may receive IoT application 405 including a manifest includes information (e.g., a name, a version number) that identifies one or more virtual IoT device APIs 415 and/or one or more driver APIs 435 that may be needed to execute IoT application 405. Here, IoT API manager 418 may determine whether device 400 stores the one or more virtual IoT device APIs 415 and/or the one or more driver APIs 435 and, if not, IoT API manager 418 may retrieve (e.g., from an online storage device, such as IoT app store device 260) and store the one or more virtual IoT device APIs 415 and/or the one or more driver APIs 435 (e.g., such that the one or more virtual IoT device APIs 415 and/or the one or more driver APIs 435 may be loaded when IoT application 405 is executed at a later time).

IoT protocol 420 may perform operations associated with standardizing information formats and/or control formats between IoT application 405 and one or more other functional elements of device 400. In some implementations, IoT protocol 420 may use an open source protocol, such as constrained application protocol (CoAP), message queue telemetry transport (MQTT) protocol, lightweight M2M (LWM2M) protocol, or the like.

OS 425 may perform operations associated with managing resources (e.g., hardware resources, software resources, etc.) of device 400 and/or providing services for one or more functional elements of device 400. For example, OS 425 may include an operating system, such as Android, Red Hat, Ubuntu, iOS, or the like.

COM port driver 430 may perform operations associated with managing and/or controlling communications ports of device 400. For example, COM port driver 430 may perform operations associated with managing and/or controlling communication via one or more ports, such as an Ethernet port, a RS-485 port, a RS-232 port, a universal asynchronous receiver/transmitter (UART) port, a universal serial bus (USB) port, a port associated with communicating via a cellular network (e.g., a 3G network, an LTE network, etc.).

Driver API 435 may perform operations associated with managing and/or controlling communication with one or more hardware components of device 400. For example, driver API 435 may perform operations associated with setting, managing, and/or controlling analog I/O pins of device 400, digital I/O pins of device 400, or the like. In some implementations, driver API 435 may communicate with other functional elements of device 400, such as virtual IoT device API 415. In some implementations, device 400 may include one or more driver APIs 435 (e.g., where each of the one or more driver APIs 435 may be associated with one or more IoT applications 405 and/or one or more virtual IoT device APIs 415).

IoT control interface 440 may perform operations associated with a hardware interface across which one or more functional elements of device 400 exchange information, such as virtual IoT device API 415 and driver API 435. In some implementations, IoT control interface 440 may perform operations associated with mapping a (e.g., translated) second function, associated with an IoT application 405 and translated by virtual IoT device API 415, such that driver API 435 may cause IoT device 210 to operate based on the translated function.

The number and arrangement of functional elements shown in FIG. 4 are provided as an example. In practice, device 400 may include additional functional elements, fewer functional elements, different functional elements, and/or differently arranged functional elements than those shown in FIG. 4. Additionally, or alternatively, a set of functional elements (e.g., one or more functional elements) of device 400 may perform one or more functions described as being performed by another set of functional elements of device 400.

Figure 5:
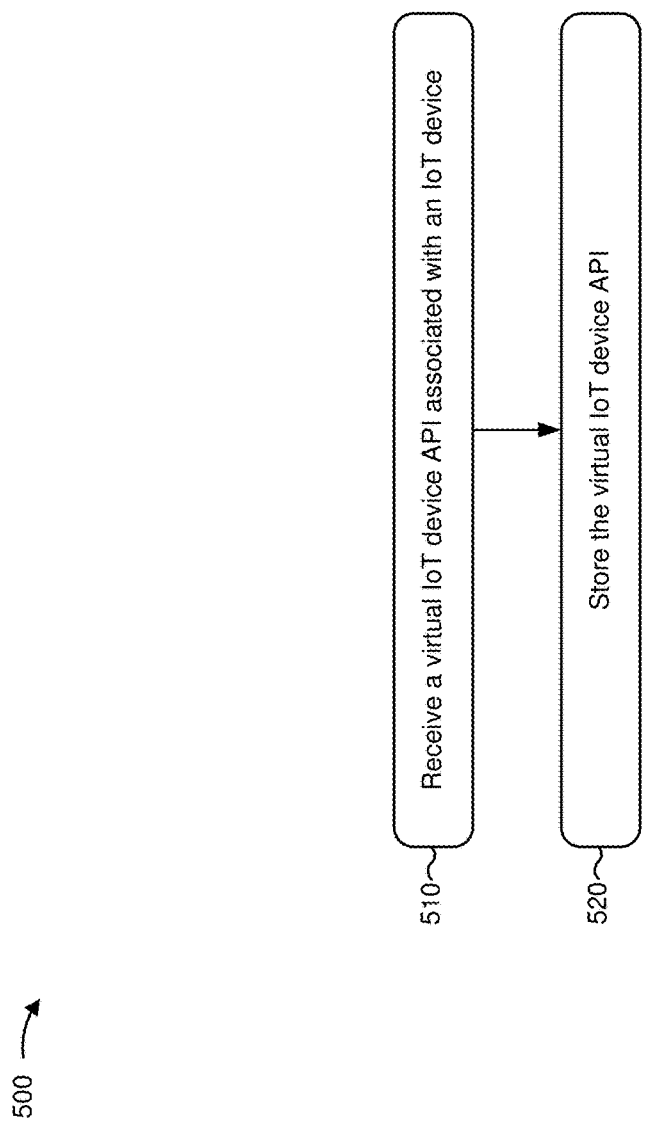
FIG. 5 is a flow chart of an example process for receiving and storing a virtual IoT device API associated with an IoT device.

FIG. 5 is a flow chart of an example process 500 for receiving and storing a virtual IoT device API associated with an IoT device. In some implementations, one or more process blocks of FIG. 5 may be performed by IoT controller 220. In some implementations, one or more process blocks of FIG. 5 may be performed by another device or a set of devices separate from or including IoT controller 220, such as one or more other components of IoT device 210.

As shown in FIG. 5, process 500 may include receiving a virtual IoT device API associated with an IoT device (block 510). For example, IoT controller 220 may receive virtual IoT device API 415 associated with IoT device 210. In some implementations, IoT controller 220 may receive virtual IoT device API 415 when another device provides virtual IoT device API 415, such as IoT device developer device 250 or IoT app store device 260. Additionally, or alternatively, IoT controller 220 may receive virtual IoT device API 415 during manufacture and/or configuration of IoT device 210 (e.g., virtual IoT device API 415 may be provided to IoT controller 220 when IoT device 210 is manufactured and/or configured by the IoT device developer). Additionally, or alternatively, IoT controller 220 may receive virtual IoT device API 415 at another time (e.g., IoT controller 220 may download virtual IoT device API 415 at a later time).

In some implementations, virtual IoT device API 415 may be created by the IoT device developer in order to allow IoT device 210 to operate based on one or more IoT applications via virtual IoT device API 415. For example, the IoT device developer may obtain (e.g., from an entity associated with designing IoT controller 220) information associated with driver API 435 (e.g., a driver manual that identifies available functions, parameters, pins, ports, serial peripheral interfaces, etc). Here, the IoT device developer may create virtual IoT device API 415 based on the information associated with driver API 435. For example, with respect to a robotics device, the IoT device developer may create virtual IoT device API 415 such that a movement control is associated with a particular port, and that a first pin (e.g., pin 1) corresponds to a left arm of the robotics device, a second pin (e.g., pin 2) corresponds to a right arm of the robotics device, a first parameter value (e.g., 1) corresponds to a moving an arm in an upward direction, a second parameter value (e.g., 0) corresponds to moving an arm in a downward direction, or the like. Here, virtual IoT device API 415 may be used to translate a first function, associated with IoT application 405, to a second function, in order to cause IoT device 210 to operate. Continuing with the above example, virtual IoT device API 415 may be created such that a first function (e.g., written in a high-level programming language) indicating that the left arm of the robotics device is to move in the upward direction translates to a second function (e.g., dio (pin 1, 1)) that may be carried out by driver API 435.

In some implementations, virtual IoT device API 415 may include information that allows multiple IoT applications to be independently developed for IoT device 210. For example, with respect to a robotics device, virtual IoT device API 415 may include information associated with a first port that is to be used for movement control, a second port that is to be used for voice communication, and so on. As such, independent IoT applications developers may develop IoT applications for IoT device 210 (e.g., since virtual IoT device API 415 will be identical for each IoT application 405) independent of one another. For example, an IoT application developer may develop a movement control application concurrently with another (e.g., independent) IoT application developer developing a voice communication application.

As further shown in FIG. 5, process 500 may include storing the virtual IoT device API (block 520). For example, IoT controller 220 may store virtual IoT device API 415. In some implementations, IoT controller 220 may store virtual IoT device API 415 when IoT controller 220 receives virtual IoT device API 415 (e.g., after IoT controller 220 receives virtual IoT device API 415). Additionally, or alternatively, IoT controller 220 may store virtual IoT device API 415 based on information, indicating that IoT controller 220 is to store virtual IoT device API 415, received from another device, such as user device 230. In some implementations, IoT controller 220 may store virtual IoT device API 415 in a memory location (e.g., of a flash memory, a RAM, a ROM, a cache, a hard disk, etc.) of IoT controller 220.

In some implementations, IoT controller 220 may store information associated with virtual IoT device API 415 such that a previous virtual IoT device API 415 (e.g., virtual IoT device API 415 received at an earlier time) is overwritten and/or deleted. Additionally, or alternatively, IoT controller 220 may store virtual IoT device API 415 such that IoT controller 220 may load virtual IoT device API 415 at a later time. In some implementations, IoT controller 220 may store multiple virtual IoT device APIs 415 associated with different IoT devices 210 and/or different IoT applications 405.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
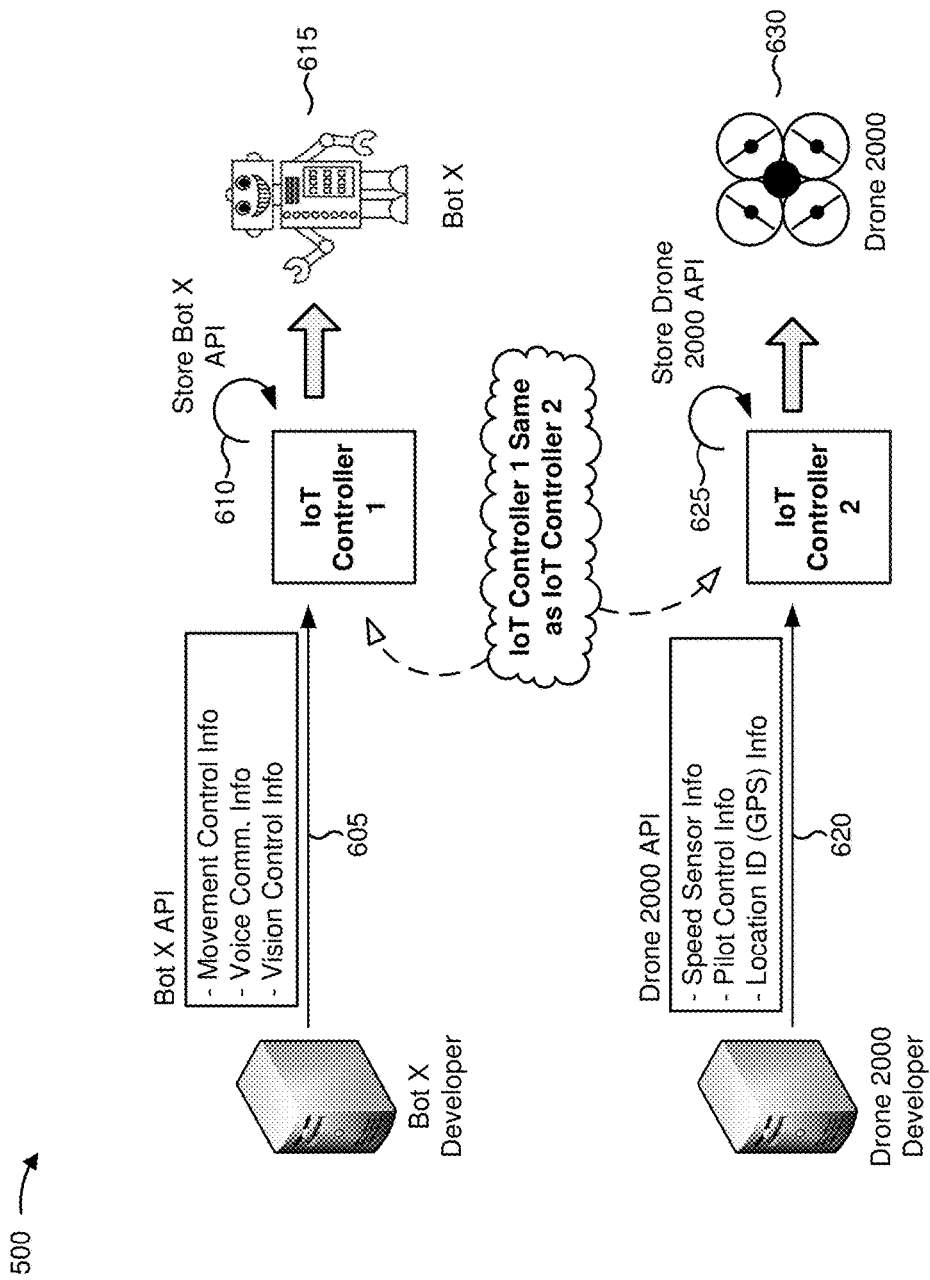
FIG. 6 is a diagram of an example implementation relating to the example process shown in FIG. 5.

FIG. 6 is a diagram of an example implementation 600 relating to example process 500 shown in FIG. 5. For the purposes of example implementation 600, assume that a first IoT device developer (e.g., Bot X developer) has created a first virtual IoT device API 415 (e.g., Bot X API) for a first IoT device 210 (e.g., Bot X) based on driver information (e.g., associated with driver API 435) for IoT controller 220. Similarly, assume that a second IoT device developer (e.g., Drone 2000 developer) has created a second virtual IoT device API 415 (e.g., Drone 2000 API) for a second IoT device 210 (e.g., Drone 2000) based on the driver information for IoT controller 220. In other words, assume that the Bot X developer and the Drone 2000 developer have created the Bot X API and the Drone 2000 API, respectively, based on the same driver information associated with IoT controller 220.

As shown in the upper portion of FIG. 6, and by reference number 605, a Bot X developer device may provide, to a first IoT controller 220 (e.g., IoT controller 1), the Bot X API. As shown, the Bot X API may include information (e.g., that identifies functions, parameters, pins, ports, serial peripheral interfaces, etc.) associated with translating movement control functions, vision control functions, and voice communication functions for Bot X. As shown by reference number 610, IoT controller 1 may store the Bot X API. As shown by reference number 615, IoT controller 1 may be installed in Bot X.

Similarly, as shown in the lower portion of FIG. 6, and by reference number 620, a Drone 2000 developer device may provide, to a second IoT controller 220 (e.g., IoT controller 2) the Drone 2000 API. As shown, the Drone 2000 API may include information associated with translating speed sensor functions, pilot control functions, and location identification functions for Drone 2000. As shown by reference number 625, IoT controller 2 may store the Drone 2000 API. As shown by reference number 630, IoT controller 2 may be installed in Drone 2000.

As noted in FIG. 6, IoT controller 1 may be the same as IoT controller 2. In other words, IoT controller 1 and IoT controller 2 may be generic IoT controllers 220 that may operate their respective IoT devices 210 based on loading corresponding virtual IoT device APIs 415 (i.e., IoT controller 220 may be software-defined). As an example, while FIG. 6 describes IoT controller 1 as being used to carry out functions associated with Bot X applications, IoT controller 1 may also be capable of receiving the Drone 2000 API, and being installed in Drone 2000 (e.g., such that IoT controller 1 may carry out functions, associated with Drone 2000 applications, based on the Drone 2000 API). In this way, virtual IoT device APIs 415 may allow a generic IoT controller 220 to be software-defined for use in different IoT applications 405 and/or in different IoT devices 210.

As indicated above, FIG. 6 is provided merely as an example. Other examples are possible and may differ from what was described with regard to FIG. 6.

FIG. 7 is a flow chart of an example process 700 for causing an IoT device to operate based on translating a function, associated with an IoT application for the IoT device, using a virtual IoT device API. In some implementations, one or more process blocks of FIG. 7 may be performed by IoT controller 220. In some implementations, one or more process blocks of FIG. 7 may be performed by another device or a set of devices separate from or including IoT controller 220, such as one or more other components of IoT device 210.

As shown in FIG. 7, process 700 may include executing an IoT application associated with an IoT device (block 710). For example, IoT controller 220 may execute IoT application 405 associated with IoT device 210. In some implementations, IoT controller 220 may execute IoT application 405 when IoT controller 220 receives an indication to execute IoT application 405.

In some implementations, IoT controller 220 may execute IoT application 405 based on information provided by another device, such as user device 230. For example, user device 230 may provide (e.g., based on user input) an indication that IoT controller 220 is to execute IoT application 405, and IoT controller 220 may execute IoT application 405 accordingly. As an example, user device 230 may provide, to IoT controller 220 included in a web cam device, an indication that IoT controller 220 is to execute a video capture application associated with the web cam device. Here, IoT controller 220 may receive the indication, and may execute the video capture application accordingly.

In some implementations, IoT controller 220 may execute IoT application 405 based on information stored by IoT controller 220. For example, IoT controller 220 may receive (e.g., from user device 230, from app store device 260, etc.) information associated with IoT application 405, and may store the information associated with IoT application 405. Here, IoT controller 220 may execute IoT application 405 based on the stored information. In some implementations, IoT controller 220 may store multiple IoT applications 405. For example, IoT controller 220 may receive and store a first IoT application 405 at a first time, and may receive and store a second IoT application 405 at a second time (e.g., a later time). In some implementations, IoT controller 220 may execute one or more of the multiple IoT applications 405 (i.e., IoT controller 220 may concurrently execute the one or more IoT applications 405).

As further shown in FIG. 7, process 700 may include loading a virtual IoT device API associated with the IoT device (block 720). For example, IoT controller 220 may load virtual IoT device API 415 associated with IoT device 210. In some implementations, IoT controller 220 may load virtual IoT device API 415 when (e.g., before, after, concurrently with) executing IoT application 405. Additionally, or alternatively, IoT controller 220 may load virtual IoT device API 415 when IoT controller 220 receives an indication to load virtual IoT device API 415.

In some implementations, IoT controller 220 may load virtual IoT device API 415 based on information stored by IoT controller 220. For example, IoT controller 220 may receive and store virtual IoT device API 415, as described above, and may load virtual IoT device API 415 from a memory storage location associated with storing virtual IoT device API 415.

In some implementations, IoT controller 220 may automatically load virtual IoT device API 415 when IoT controller 220 receives an indication to execute any IoT application 405 associated with IoT device 210 (e.g., such that IoT controller 220 loads virtual IoT device API 415 for each IoT application 405). In some implementations, IoT controller 220 may load multiple virtual IoT device APIs 415. For example, IoT controller 220 may load multiple virtual IoT device APIs 415 when a single IoT application 405 is configured to use multiple virtual IoT device APIs 415. As another example, IoT controller 220 may load multiple virtual IoT device APIs 415 when IoT controller 220 executes multiple IoT applications 405 (e.g., where each IoT application 405 is configured to use one or more of the multiple virtual IoT device APIs 415).

As further shown in FIG. 7, process 700 may include receiving a command associated with the IoT application (block 730). For example, IoT controller 220 may receive a command associated with IoT application 405. In some implementations, IoT controller 220 may receive the command after IoT controller 220 executes IoT application 405. Additionally, or alternatively, IoT controller 220 may receive the command when another device provides the command, such as when user device 230 provides the command.

A command may include information, associated with IoT application 405, that indicates that IoT controller 220 is to control, manage, manipulate, operate, and/or communicate with IoT device 210 in a manner corresponding to the command. For example, the command may be associated with controlling movement of a robotics device, performing object analysis using a camera of a drone, recording a measurement (e.g., a speed, a temperature, a pressure) detected by a sensor, and so on.

In some implementations, IoT controller 220 may receive the command based on information provided by user device 230. For example, user device 230 may provide (e.g., based on a user indication) a command indicating that IoT device 210 is to operate in a particular manner. Here, IoT controller 220 may receive the command via network 270. As a particular example, a user may indicate (e.g., by selecting a button on a user interface of user device 230), that a robotics device is to move a left leg forward. Here, user device 230 may provide (e.g., via network 270) a command to IoT controller 220 included in the robotics device. In this example, IoT controller 220 (e.g., IoT application 405) may identify a function, corresponding to the command, as described below.

In some implementations, IoT controller 220 may receive multiple commands associated with IoT application 405 (e.g., concurrently, in a series, in a sequence, etc.). Additionally, or alternatively, IoT controller 220 may receive (e.g., concurrently, in a series, in a sequence, etc.) multiple commands associated with multiple IoT applications 405 (e.g., when IoT controller 220 is executing multiple IoT applications 405 at the same time).

As further shown in FIG. 7, process 700 may include identifying a first function corresponding to the command (block 740). For example, IoT controller 220 may identify a first function corresponding to the command. In some implementations, IoT controller 220 may identify the first function after IoT controller 220 receives the command. Additionally, or alternatively, IoT controller 220 may identify the first function at another time (e.g., when IoT controller 220 is configured to automatically identify the first function).

A first function, as used herein, may include information, in the form of high-level programming code, that identifies the manner in which IoT controller 220 is to control, manage, manipulate, operate, and/or communicate with IoT device 210. Continuing with the above example, IoT controller 220 may receive the command associated with moving the left leg of the robotics device forward, and IoT controller 220 (e.g., IoT application 405) may identify a first function corresponding to the command (e.g., move (leg, left, forward)) for virtual IoT device API 415 (e.g., such that virtual IoT device API 415 may translate the first function to a second function, as described below). As shown in this example, in some implementations, IoT controller 220 may identify the function, corresponding to the command based on information associated with IoT application 405. In some implementations, IoT controller 220 may identify multiple first functions associated with one or more commands. For example, IoT controller 220 may identify a set of first functions corresponding to a set of commands associated with IoT application 405 being executed by IoT controller 220. As another example, IoT controller 220 may identify a set of first functions corresponding to a set of commands associated with multiple IoT applications 405 being executed by IoT controller 220.

As further shown in FIG. 7, process 700 may include translating the first function to a second function based on the virtual IoT device API (block 750). For example, IoT controller 220 may translate the first function to a second function based on virtual IoT device API 415. In some implementations, IoT controller 220 may translate the first function after IoT controller 220 identifies the first function for virtual IoT device API 415.

A second function, as used herein, may include information, in the form of a programming code that may be used to control hardware, that identifies the manner in which IoT controller 220 is to control, manage, manipulate, operate, and/or communicate with IoT device 210.

In some implementations, IoT controller 220 (e.g., virtual IoT device API 415) may translate the first function based on information associated with virtual IoT device API 415. Continuing with the above example, IoT application 405 may identify the first function (e.g., move (left, leg, forward)) for virtual IoT device API 415, and virtual IoT device API 415 may translate the first function to a second function based on information associated with virtual IoT device API 415. Here, for example, virtual IoT device API 415 may translate the first function to a second function (e.g., dio (pin 2, 0)) such that the second function may be identified for driver API 435 in order to control the robotics device. In this way, IoT controller 220 (e.g., virtual IoT device API 415) may isolate IoT application 405 from directly controlling IoT device 210. As such, IoT application 405 may be developed in a high-level program language (e.g., rather than a hardware dependent programming language).

In some implementations, IoT controller 220 may translate multiple first functions to multiple second functions. For example, IoT controller 220 may translate a set of first functions, associated with multiple IoT applications 405 being concurrently executed by IoT controller 220, to a set of second functions associated with controlling IoT device 210.

As further shown in FIG. 7, process 700 may include causing the IoT device to operate based on the second function (block 760). For example, IoT controller 220 may cause IoT device 210 to operate based on the second function. In some implementations, IoT controller 220 may cause IoT device 210 to operate after IoT controller 220 translates the first function to the second function.

In some implementations, IoT controller 220 (e.g., virtual IoT device API 415) may cause IoT device 210 to operate, based on the second function, by identifying the second function for driver API 435. Continuing with the above example, virtual IoT device API 415 may identify the second function (e.g., dio (pin 2, 0)) on driver API 435, and driver API 435 may carry out the function (e.g., by setting a second pin to a particular value) such that the left leg of the robotics device moves forward in accordance with the command.

In some implementations, IoT controller 220 may cause IoT device 210 to operate based on multiple second functions. For example, IoT controller 220 may cause IoT device 210 to operate based on a set of second functions, where each second function, of the set of second functions, may be associated with a different IoT application 405 of multiple IoT applications 405 being concurrently executed by IoT controller 220. In some implementations, driver API 435 may carry out the set of second functions based on rules information, stored or accessible by driver API 435, associated with resolving a conflict between two or more second functions of the set of second functions (e.g., when the two or more second functions use the same driver API 435). Additional details regarding the use of rules information are described below.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
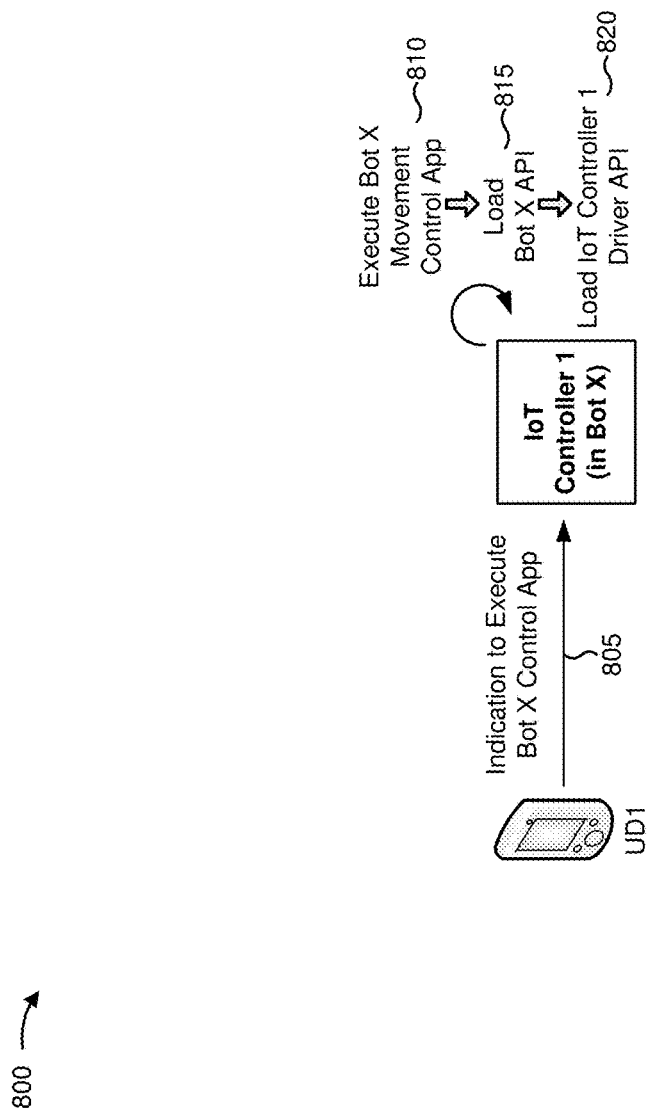
FIGS. 8A and 8B are diagrams of an example implementation relating to the example process shown in FIG. 7.
Figure 8B:
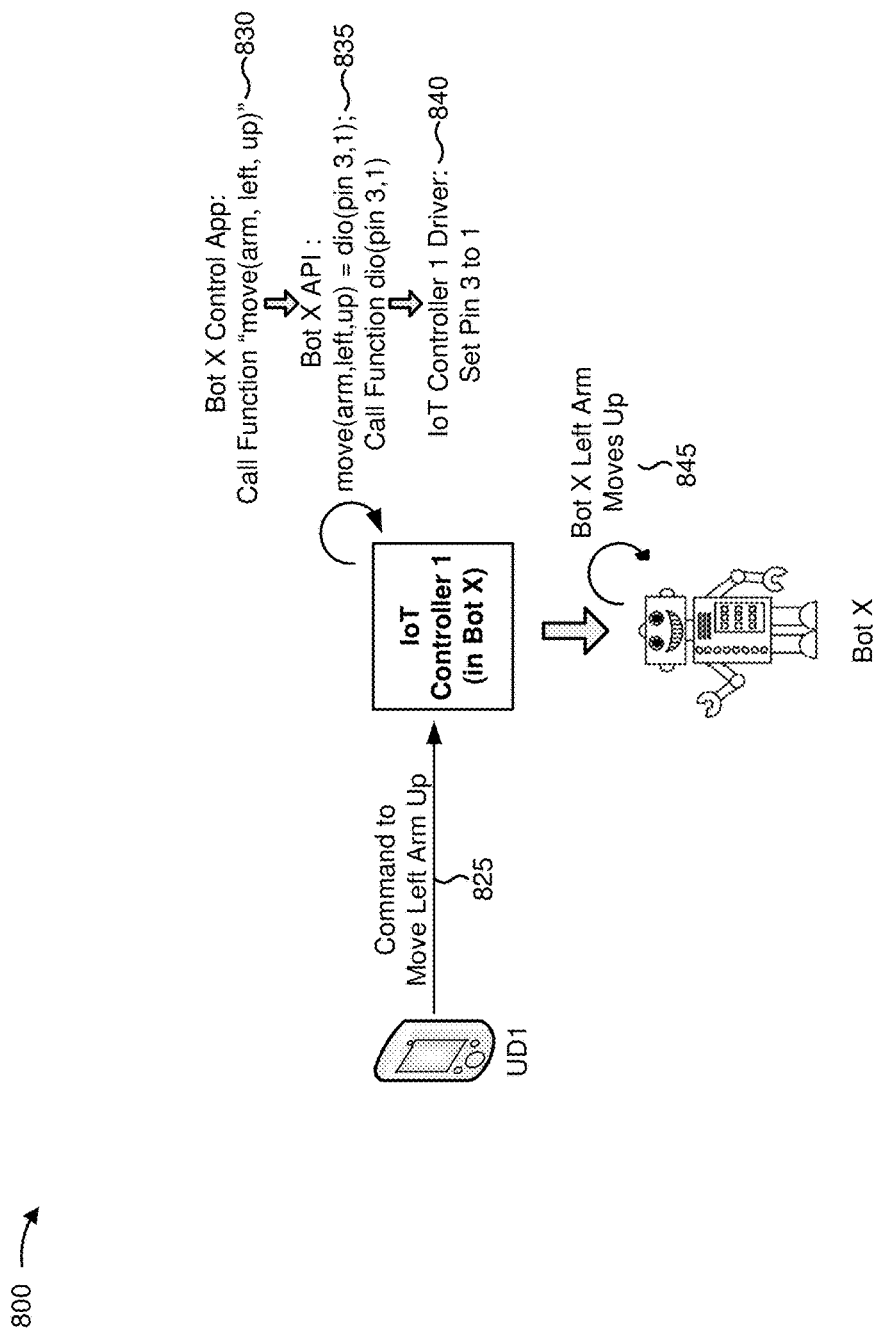

FIGS. 8A and 8B are diagrams of an example implementation 800 relating to example process 700 shown in FIG. 7. For the purposes of example implementation 800, assume that IoT controller 220 (e.g., IoT controller 1) is included in IoT device 210 (e.g., Bot X), and that IoT controller 1 stores or has access to an IoT application 405 (e.g., Bot X movement control application) associated with Bot X, virtual IoT device API 415 (e.g., Bot X API) associated with Bot X, and driver API 435 (e.g., IoT controller 1 driver API) associated with IoT controller 1. Further, assume that user device 230 (e.g., UD1) is configured to control Bot X via the Bot X movement control application.

As shown in FIG. 8A, and by reference number 805, IoT controller 1 may receive, from UD1 (e.g., based on user input), an indication to execute the Bot X movement control application. As shown by reference number 810, IoT controller 1 may execute the Bot X movement control application. As shown by reference number 815, IoT controller 1 may also load (e.g., from a memory location of IoT controller 1), the Bot X API. As shown by reference number 820, IoT controller 1 may also load the IoT controller 1 API (e.g., from a memory location of IoT controller 1).

As shown in FIG. 8B, and by reference number 825, UD1 may provide (e.g., based on user input and via the Bot X movement control application) a command to move a left arm of Bot X in an upward direction. As shown by reference number 830, IoT controller 1 may receive the command, and the Bot X movement control application (e.g., being executed by IoT controller 1) may identify a first function (e.g., move (arm, left, up)), corresponding to the command, for the Bot X API. As shown by reference number 835, the Bot X may translate, based on information associated with the Bot X API, the first function to a second function (e.g., move (arm, left, up)=dio (pin 3, 1)), and may identify the second function for the IoT controller 1 driver. As shown by reference number 840, the IoT controller 1 driver may, based on the second function, manipulate Bot X accordingly (e.g., by setting pin 3 to a value of 1). As shown by reference number 845, the left arm of Bot X may move in the upward direction based on the manipulation by the IoT controller 1 driver.

As indicated above, FIGS. 8A and 8B are provided merely as an example. Other examples are possible and may differ from what was described with regard to FIGS. 8A and 8B.

Figure 9:
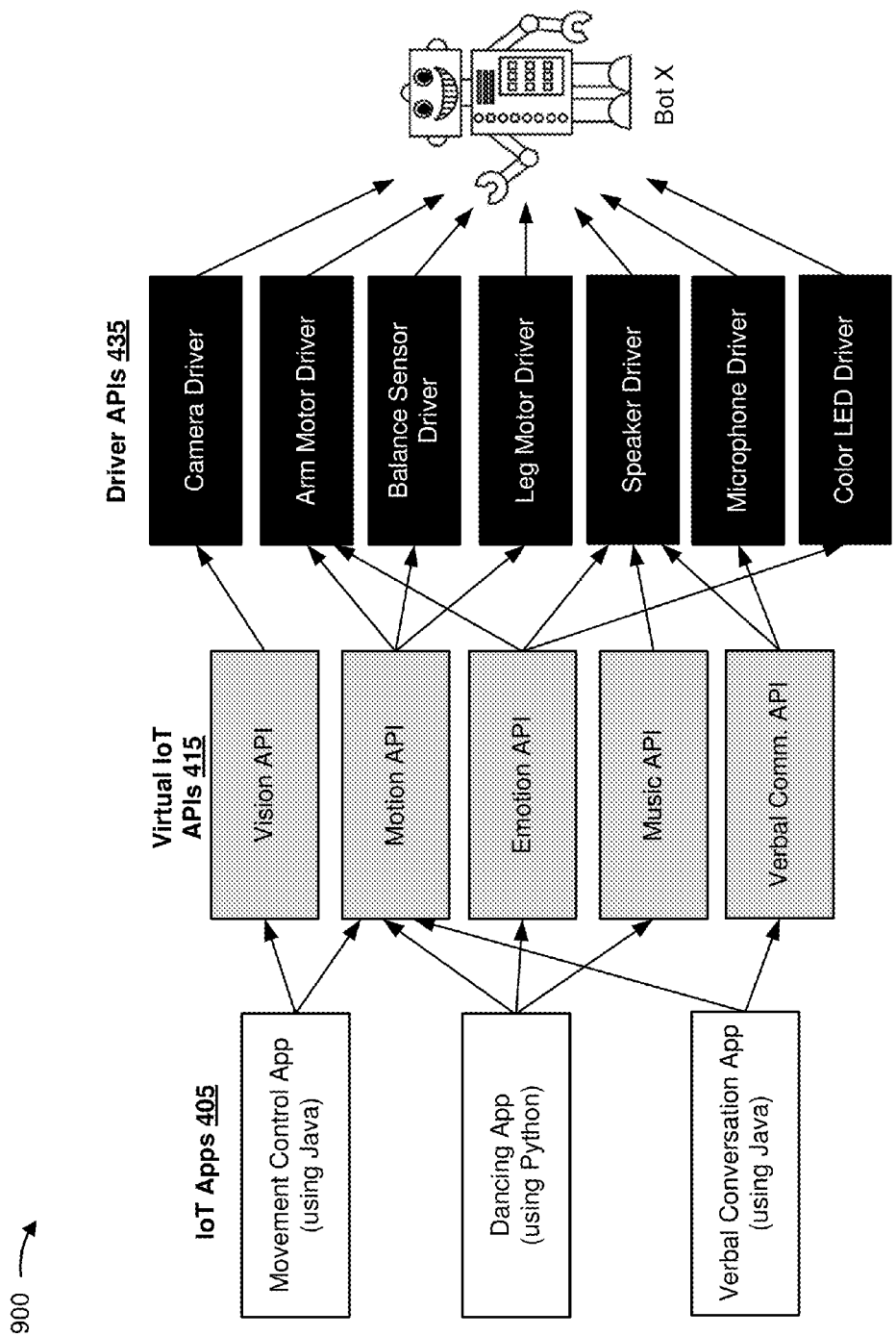
FIG. 9 is a diagram of an example showing a manner in which multiple IoT applications, multiple virtual IoT device APIs, and/or multiple driver APIs may interact in accordance with implementations described herein.

FIG. 9 is a diagram of an example 900 showing a manner in which multiple IoT applications, multiple virtual IoT device APIs, and/or multiple driver APIs may interact in accordance with implementations described herein. For the purposes of FIG. 9, assume that IoT controller 220 included in device 210 (e.g., Bot X) stores three IoT applications 405 (e.g., a movement control application, a dancing application, and a verbal conversation application), five virtual IoT device APIs 415 (e.g., a vision API, a motion API, an emotion API, a music API, and a verbal communication API), and seven driver APIs 435 (e.g., a camera driver, an arm motor driver, a balance sensor driver, a leg motor driver, a speaker driver, a microphone driver, and a color light emitting diode (LED) driver).

As shown in FIG. 9, a particular IoT application 405 may use one or more virtual IoT device APIs 415. For example, the movement control application may use the vision API and the motion API. As another example, the dancing application may use the motion API, the emotion API, and the music API. As an additional example, the verbal conversation application may use the motion API and the verbal communication API. As such, each virtual IoT device API 415 may be used and/or shared by one or more (e.g., independently developed) IoT applications 405 (e.g., where concurrent usage of each virtual IoT device API 415 may be managed by application resource manager 410 in accordance with a collaboration list maintained by IoT controller 220).

As further shown in FIG. 9, a particular virtual IoT device API 415 may use one or more driver APIs 435. For example, the vision API may use the camera driver. As another example, the motion API may use the arm motor driver, the balance sensor driver, and the leg motor driver. As yet another example, the emotion API may use the arm motor driver, the speaker driver, and the color LED driver. As still another example, the music API may use the speaker driver. As a final example, the verbal communication API may use the speaker driver and the microphone driver. As such, each driver API 435 may be used and/or shared by one or more virtual IoT device APIs 415 (e.g., where concurrent usage of each driver API 435 may be managed by application resource manager 410 in accordance with a collaboration list maintained by IoT controller 220).

In some implementations, each driver API 435 may store or have access to rules information associated with operating IoT device 210. The rules information may include information associated with resolving a conflict between second functions to be carried out driver 435. For example, the rules information may include information associated with resolving a conflict based on a preferred scenario associated with IoT device 210 (e.g., a hardware limitation, etc.), a hardware status associated with IoT device 210 (e.g. a robot's leg position, etc.), or another type of information. In some implementations, driver API 435 may resolve a conflict, associated with two or more second functions, based on the rules information. For example, driver API 435 may receive a first second function (e.g., function A) via a first virtual IoT device API 415, and may receive (e.g., simultaneously, in a series, in a sequence, etc.) a second function (e.g., function B) via a second virtual IoT device API 415 (e.g., before driver API 435 carries out function A). Here, driver API 435 may determine, based on the rules information, if driver API 435 is to carry out function A before carrying out function B, or if driver API 435 is to carry out function B before carrying out function A, and may act accordingly. In other words, driver API 435 may use the rules information to determine a priority associated with carrying out multiple functions associated with multiple virtual IoT device APIs 415.

In some implementations, IoT controller 220 may store multiple versions of virtual IoT device API 415 such that each of the one or more versions may be used in association with IoT application 405. As such, two different IoT applications 405 may call a same virtual IoT device API 415, but each of the two different IoT applications 405 may use a different version of the same virtual IoT device API 415. Additionally, or alternatively, IoT controller 220 may store multiple versions of driver API 435 such that each of the one or more versions may be used in association with virtual IoT device API 415. As such, two different virtual IoT device APIs 415 may call a same driver API 435, but each of the two different virtual IoT device APIs 415 may use a different version of the same driver API 435.

In this way, one or more IoT applications 405, one or more virtual IoT device APIs 415, and/or one or more driver APIs 435 may be mixed and matched for (e.g., concurrent) use by IoT controller 220 to control, manage, manipulate, operate, and/or communicate with IoT device 210.

Figure 10:
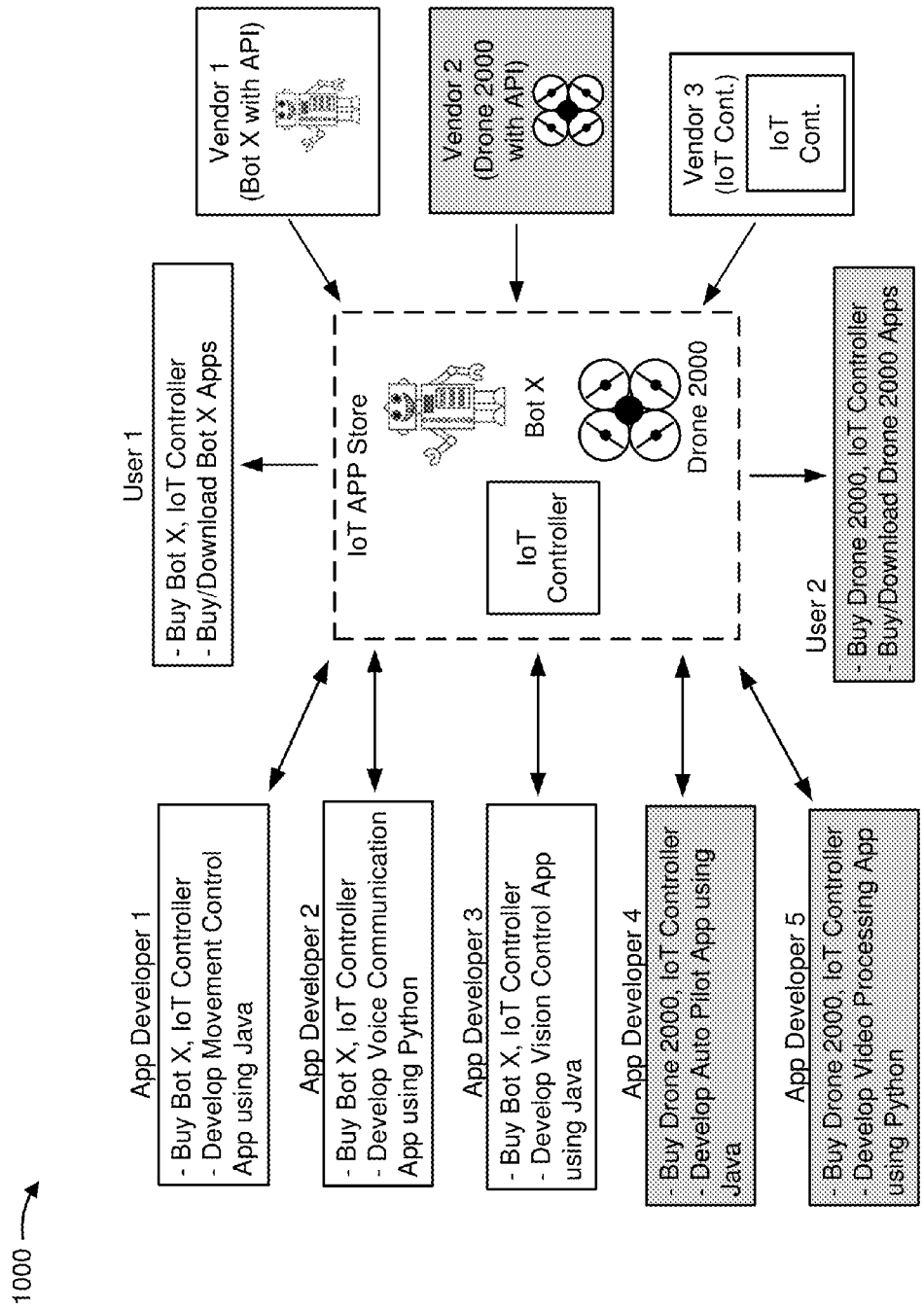
FIG. 10 is a diagram of an example IoT app store environment associated with implementations described herein.

FIG. 10 is a diagram of an example IoT app store environment 1000 associated with implementations described herein. Environment 1000 shows an example of a manner in which implementations described herein may enable an IoT app store based on using a software-defined (e.g., generic) IoT controller 220. For the purposes of FIG. 10, assume that a group of application developers (e.g., app developer 1 through app developer 5), a group of users (e.g., user 1 and user 2), and a group of vendors (e.g., vendor 1, vendor 2, and vendor 3) have access to an IoT app store (e.g., hosted by IoT app store device 260).

As shown, assume that vendor 1 sells a first IoT device (e.g., Bot X and a Bot X API created for a generic IoT controller) via the IoT app store, vendor 2 sells a second IoT device (e.g., Drone 2000 and a Drone 2000 API created for the generic IoT controller) via the IoT app store, and vendor 3 sells the generic IoT controller via the IoT app store.

As further shown, each application developer may independently develop an application for an IoT device. For example, app developer 1 may purchase Bot X (e.g., including the Bot X API) and a generic IoT controller, and may develop a Bot X movement control application using Java programming language. As another example, app developer 2 may purchase Bot X (e.g., including the Bot X API) and a generic IoT controller, and may develop a Bot X voice communication application using Python programming language. As still another example, app developer 3 may purchase Bot X (e.g., including the Bot X API) and a generic IoT controller, and may develop a Bot X vision control application using Java programming language. As yet another example, app developer 4 may purchase Drone 2000 (e.g., including the Drone 2000 API) and a generic IoT controller, and may develop a Drone 2000 auto pilot application using Java programming language. As a final example, app developer 5 may purchase Drone 2000 (e.g., including the Drone 2000 API) and a generic IoT controller, and may develop a Drone 2000 video processing application using Python programming language.

As shown, each user may then purchase an IoT device, a generic IoT controller, and one or more applications associated with the purchased IoT device. For example, user 1 may purchase Bot X, a generic IoT controller, and the Bot X applications (e.g., the movement control application, the voice communication application, and/or the vision control application). As another example, user 2 may purchase Drone 2000, a generic IoT controller, and the Drone 2000 applications (e.g., the auto pilot application and/or the video processing application). Here, using the generic IoT controller may enable the IoT app store to as described below.

As indicated above, FIG. 10 is provided merely as an example. Other examples are possible and may differ from what was described with regard to FIG. 10.

Implementations described herein provide a platform that uses a virtual IoT device API that allows a generic IoT controller to be software-defined for use in different IoT applications and/or different IoT devices. Moreover, in some implementations, the platform may allow an IoT application developer, associated with an IoT application, to develop the IoT application using a high-level programming language (e.g., based on the virtual IoT device API).

In some implementations, the software-defined (e.g., re-configurable by software) generic IoT controller may be described as a multipurpose IoT controller. For example, multiple IoT applications may be stored by the generic IoT controller in the IoT device, and the generic IoT controller may concurrently execute two or more of the multiple IoT applications (e.g., with different purposes). Additionally, or alternatively, the software-defined generic IoT controller may be described as a universal IoT controller. For example, in an implementation associated with a camera application, the generic IoT controller may act as a 4G enabled webcam. As another example, in an implementation associated with a credit card reader application and a vending control application, the generic IoT controller may act as an advanced vending machine controller.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or command used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An Internet of things (IoT) controller, comprising:
   a memory storing instructions; and
   a processor to execute the instructions to:
      execute a first IoT application associated with operating an IoT device;
      execute a second IoT application associated with operating the IoT device,
         the second IoT application being executed during execution of the first IoT application;
      load at least one virtual IoT device application program interface (API) associated with the first IoT application and the second IoT application;
      identify a first set of functions,
         the first set of functions including:
            a first functional associated with the first IoT application, and
            a second function associated with the second IoT application;
      translate the first set of functions to a second set of functions based on the at least one virtual IoT device API,
         the second set of functions including:
            a third function identifiable for at least one driver API to control the IoT device, and
            a fourth function identifiable for the at least one driver API to control the IoT device; and
      cause the IoT device to operate, via the at least one driver API, based on the second set of functions,
         the IoT device being caused to operate during execution of the first IoT application and the second IoT application.

2. The IoT controller of claim 1, where the first function is associated with a first high-level programming language, the second function is associated with a second high-level programming language, and the third function and the fourth function are associated with a hardware-dependent programming language.

3. The IoT controller of claim 1, where the processor is further to:
   receive the at least one virtual IoT device API; and
   store the at least one virtual IoT device API; and
   where the processor, when loading the at least one virtual IoT device API, is to:
      load the at least one virtual IoT device API after storing the at least one virtual IoT device API.

4. The IoT controller of claim 1, where the processor is further to:
   determine rules information associated with operating the IoT device, the rules information identifying a priority associated with the third function and the fourth function; and where the processor, when causing the IoT device to operate, via the at least one driver API, based on the second set of functions, is to:

cause the IoT device to operate, via the at least one driver API, based on third function and the fourth function, and in accordance with the rules information.

5. The IoT controller of claim 1, where the processor is further to:

receive the first IoT application via an IoT app store device; and store the first IoT application; and where the processor, when executing the first IoT application, is to:

execute the first IoT application after storing the first IoT application.

6. The IoT controller of claim 5, where the processor is further to:

receive the second IoT application, the second IoT application being received after the first IoT application is received; and store the second IoT application; and where the processor, when executing the second IoT application, is to:

execute the second IoT application after storing the second IoT application.

7. The IoT controller of claim 1, where the processor is further to:

load a set of driver APIs associated with the IoT device, the set of driver APIs corresponding to the at least one virtual IoT device API, and the set of driver APIs including the at least one driver API; and where the processor, when causing the IoT to operate based on the second set of functions, is to:

cause the IoT device to operate based on loading the set of driver APIs.

8. A method, comprising:

executing, by a controller, a first IoT application associated with operating an IoT device;

executing, by the controller, a second IoT application associated with operating the IoT device, the second IoT application being executed while the first IoT application is executing;

loading, by the controller, a set of virtual IoT device application program interfaces (APIs) associated with the first IoT application and the second IoT application;

identifying, by the controller, a first set of functions, the first set of functions including:

a first function associated with the first IoT application, and a second function associated with the second IoT application;

translating, by the controller, the first set of functions to a second set of functions based on the set of virtual IoT device APIs, the second set of functions including:

a third function identifiable for at least one driver API to control the IoT device, and a fourth function identifiable for the at least one driver API to control the IoT device; and causing, by the controller, the IoT device to operate, via the at least one driver API, based on the second set of functions, the IoT device being caused to operate while the first IoT application and the second IoT application are being executed.

9. The method of claim 8, where the first function is associated with a first high-level programming language, the second function is associated with a second high-level programming language, and the third function and the fourth function are associated with a hardware-dependent programming language.

10. The method of claim 8, further comprising:

receiving the set of virtual IoT device APIs; and storing the set of virtual IoT device APIs; and where loading the set of virtual IoT device APIs for the IoT device comprises:

loading the set of virtual IoT device APIs after storing the set of virtual IoT device APIs.

11. The method of claim 8, further comprising:

determining rules information associated with operating the IoT device, the rules information identifying a priority associated with the third function and the fourth function; and where causing the IoT device to operate, via the at least one driver API, based on the second set of functions comprises:

causing the IoT device to operate, via the at least one driver API, based on third function and the fourth function, and in accordance with the rules information.

12. The method of claim 8, further comprising:

receiving the first IoT application via an IoT app store device; and storing the first IoT application; and where executing the first IoT application comprises:

executing the first IoT application after storing the first IoT application.

13. The method of claim 12, further comprising:

receiving the second IoT application, the second IoT application being received after the first IoT application is received; and storing the second IoT application; and where executing the second IoT application comprises:

executing the second IoT application after storing the second IoT application.

14. The method of claim 8, further comprising:

loading a set of driver APIs, associated with the IoT device, the set of driver APIs corresponding to the set of virtual IoT device APIs, and the set of driver APIs including the at least one driver API; and where causing the IoT to operate, via the at least one driver API, based on the second set of functions comprises:

causing the IoT device to operate based on loading the set of driver APIs.

15. A system, comprising:

one or more devices comprising:

a memory to store instructions; and a processor to execute the instructions to:

execute a first IoT application associated with an IoT device;

execute a second IoT application associated with the IoT device, the second IoT application being executed during execution of the first IoT application;

load an IoT application program interface (API) associated with the first IoT application and the second IoT application;
receive a first set of functions,
the first set of functions including:
a first function associated with the first IoT application, and
a second function associated with the second IoT application;
translate the first set of functions to a second set of functions based on the IoT API,
the second set of functions including:
a third function identifiable for at least one driver API to control the IoT device, and
a fourth function identifiable for the at least one driver API to control the IoT device;
load a set of driver API corresponding to the IoT API and associated with the second set of functions; and
control the IoT device, via the at least one driver API, based on the second set of functions and the set of driver APIs,
the IoT device being controlled while the first IoT application is executing and while the second IoT application is executing.

16. The system of claim 15, where the first function is associated with a first high-level programming language, the second function is associated with a second high-level programming language, and the third function and the fourth function are associated with a hardware-dependent programming language.

17. The system of claim 15, where the processor is further to:
receive the IoT API; and
store the IoT API; and
where the processor, when loading the IoT API, is to:
load the IoT API based on storing the IoT API.

18. The system of claim 15, where the processor is further to:
determine rules information associated with operating the IoT device,
the rules information identifying a priority associated with the third function and the fourth function; and
where the processor, when controlling the IoT device, via the at least one driver API, based on the second set of functions, is to:
control the IoT device, via the at least one driver API, based on third function and the fourth function, and in accordance with the rules information.

19. The system of claim 15, where the processor is further to:
receive the first IoT application via an IoT app store device; and
store the first IoT application; and
where the processor, when executing the first IoT application, is to:
execute the first IoT application after storing the first IoT application.

20. The system of claim 19, where the processor is further to:
receive the second IoT application,
the second IoT application being received after the first IoT application is received; and
store the second IoT application; and
where the processor, when executing the second IoT application, is to:
execute the second IoT application after storing the second IoT application.

* * * * *